Figure 1:
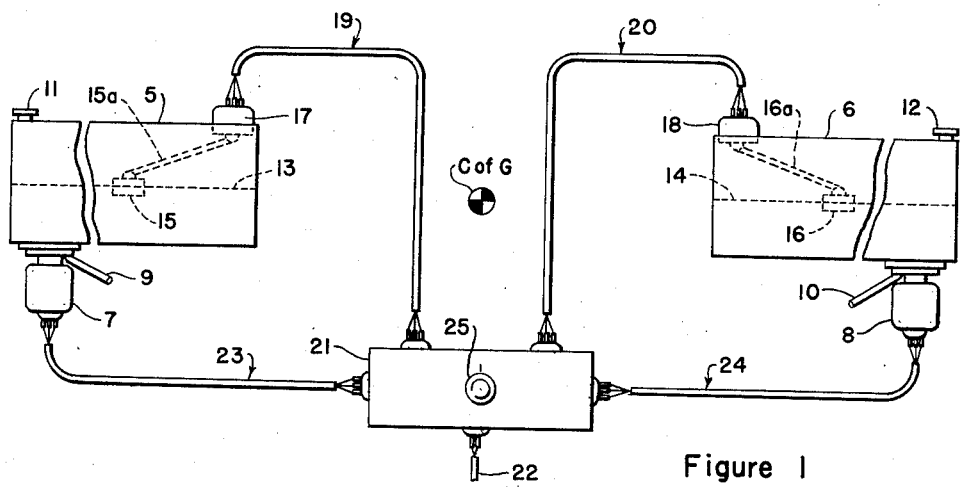

Aug. 21, 1956  E. M. DEFIBAUGH ET AL  2,759,424
FLOW PROPORTIONING CONTROL
Filed Nov. 22, 1950

Earle M. Defibaugh &
Philip H. Jones
  INVENTOR.
BY James M. Clark
  THEIR PATENT ATTORNEY.

United States Patent Office 2,759,424
Patented Aug. 21, 1956

2,759,424

FLOW PROPORTIONING CONTROL

Earle M. Defibaugh, Los Angeles, and Philip H. Jones, Beverly Hills, Calif., assignors to North American Aviation, Inc.

Application November 22, 1950, Serial No. 197,158

5 Claims. (Cl. 103—11)

The present invention relates generally to the flow control of fluids and more particularly to improved fluid flow proportioning control arrangements such as are utilized in the handling of fluids in aircraft and the like.

In the design and operation of aircraft it is frequently very desirable that the weight of the consumable and disposable loads displaced from the center of gravity of the craft be controlled within predetermined limits to prevent undesired unbalance or disturbance to the trim of the aircraft by a shift in its center of gravity. These requirements have been found of particular importance in the control of the flow of fuel from the tanks of fighter aircraft of relatively high speed, particularly in those models where fuel may be stored in tanks at appreciable distances fore and aft of the normal center of gravity, or C. of G. location of the aircraft. Serious problems have been encountered in the design of certain fighters of the jet propelled type in which the larger fuel capacity requirements have necessitated placing the tanks farther from the C. of G. location of the aircraft. This great fore and aft spread or displacement of these variable disposable loads give rise to the possibility of aft C. of G. conditions which could seriously endanger the aircraft even to the point of rendering it unflyable.

The present invention is directed to the fuel systems of such aircraft and other vehicles and provides for the delivery of fuel from both the forward and aft tanks simultaneously at a substantially equalized flow rate in order to avoid excessive C. of G. displacements. Even though identical booster pumps may be used having identical rated capacities for tanks of equal volumes which are equally spaced fore and aft of the aircraft C. of G., due to manufacturing tolerances such pumps may not be depended upon to deliver equal volumes of fuel. As regular production items these booster pumps vary slightly in their output at a given speed and may tend to permit gradual C. of G. shift which may become sufficient to establish a critical condition. The present invention is accordingly directed to a fuel proportioning control by means of which the fuel flow from such tanks is controlled and equalized in order that the C. of G. is maintained at a predetermined desired location, and the proportioning may be varied at any desired ratio.

The present invention comprises essentially an electrical control system including a balance bridge circuit in each side of which a fuel level responsive device of the variable resistance type is arranged to actuate a polarized relay in the desired direction. The polarized relay serves to actuate switching relays for motors for the respective booster pumps which have both high and low speed windings, and in the event fuel is pumped or discharged at an unequal rate, the unbalanced condition will be sensed as a difference in fuel levels and will cause the polarized relay in the circuit to switch the lagging pump motor to its high speed until the desired balance is again restored.

Figure 2:
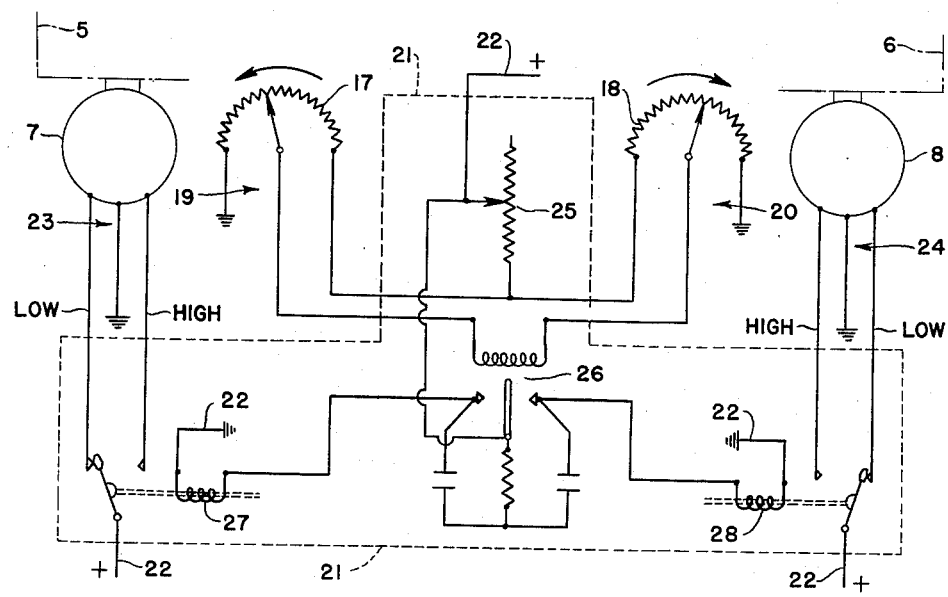

It is, accordingly, a major object of the present invention to provide a fuel proportioning control or fuel flow equalizing means whereby the fuel levels in tanks may be controlled so as to prevent a shift in C. of G. of the aircraft or other vessel or vehicle in which they are installed. It is a further object of the present invention to provide an electrical system for such a fuel proportioning control utilizing a balanced bridge circuit for the control of the respective fuel pump motors. A further object resides in the provision, in such a fuel proportioning control, of a polarized relay or micro-positioner means for the control of the respective pump motors in response to differences in fuel levels in the respective storage tanks. It is a still further object to provide a fuel discharge system of the described type in which the installation utilizes a fuel level responsive device of the variable resistance type which is designed to sense the actual volume, regardless of the shape of the tank. It is a further object of the present invention to provide such a system which includes booster fuel pumps having high and low speed windings controlled by switching relays actuated by the polarized relay for sensing the difference in fuel levels and causing the polarized relay in the circuit to switch the lagging pump motor to its high speed in order to regain the desired balance condition. Other object and advantages of the present invention, both with respect to its general arrangement and the details of its individual parts, will occur to those skilled in the art after reading the following description taken in conjunction with the accompanying drawings, forming a part hereof, in which:

Fig. 1 is a diagrammatic showing of two fuel tanks of an aircraft to which the present improved fuel proportioning control has been applied; and Fig. 2 is a wiring diagram of the electrical system for effecting the fuel proportioning control.

In the drawings, the numeral 5 represents a fuel tank spaced appreciably from the center of gravity of the aircraft as indicated by the C. of G. in the center of Fig. 1, and on the opposite side of which is disposed a similar fuel tank 6. While the tank 5 will be described as a forwardly disposed fuel tank and the tank 6 as one which is rearwardly disposed with respect to the C. of G. of the aircraft, and in which arrangement any differences in the weight of the contents of the tanks would contribute to a longitudinal shift of the C. of G., it will be understood that the present invention is equally applicable to tanks which may be disposed laterally of the C. of G., in which the shift of the C. of G. would be in the lateral direction, and it will also be obvious that the present invention is applicable to other than fuel tanks and in other than aircraft.

The forward tank 5 is provided with a motor-driven booster pump 7 discharging through the line 9 from whence the fuel is delivered to the pressurized fuel supply system and thence to the power plant of the aircraft, and the aft or rear tank 6 is similarly provided with a motor-driven booster pump 8 discharging through the pressure fuel line 10. The fuel tank 5 is provided with a filler and vent connection at 11 and its fuel level is indicated by the dotted line 13, and the aft tank 6 is similarly provided with a filler and vent connection 12 and it is indicated as having substantially the same fuel level 14.

The tank 5, which may be of the integral construction or of the self-sealing fuel cell type, is preferably provided with a fuel level responsive device comprising a float member 15 pivotally supported upon an arm 15a which in turn is pivotally supported and arranged to adjust the potentiometer or variable resistance element contained within the housing 17. The movable contact element of the potentiometer 17 is preferably connected to the arm 15a for adjusting the resistance in accordance with the change in level 13 of the fuel. One terminal of the resistance element is preferably connected to the ground and the other terminal, as well as the movable contact element form adjacent legs of a balance bridge circuit, as shown in Fig. 2. The leads from the float actuated potentiometer 17 are preferably carried through the conduit 19 to the centrally located housing 21 which may be located in the cockpit convenient to the pilot or other operator.

The aft tank 6 is also preferably provided with a float arm 16a attached to the float 16 for the adjustment of the potentiometer or variable resistance 18 in accordance with the change in level 14 of the fuel within the tank, and the leads to this potentiometer form the opposite legs of the balance bridge circuit with a similar connection to the ground, with the leads being carried through the conduit 20 to the central housing 21.

The positive side of a direct current power source is preferably carried through the conduit 22, as shown in the bottom of the housing shown in Fig. 1, with suitable connections made therefrom to the sensitivity adjusting resistor 25, and to the relays 27 and 28 for the booster motors in the respective fuel cells or tanks. A ground leg may also be carried through the conduit 22 and connected to the float-actuated potentiometers 17 and 18 as well as to the coils of the relays 27 and 28 and to the two-speed booster pump motors 7 and 8. Conduits 23 and 24 are also carried to the booster pump motors 7 and 8 for enclosing the wiring to the high and low windings of these motors, as well as the ground return legs from each. The fuel level units 15—15a—17 for the tank 5, and 16—16a—18 for the tank 6 are designed to sense the actual volume, regardless of the shape of the tank. In other words, if the tanks 5 and 6 are required to be of different capacities the resistances will remain equal and the same, but the float and arm arrangements would be such that as either tank may be emptied to a given percentage of its total capacity the variable resistance unit is also adjusted to that same percentage of its total resistance.

The operation of the fuel flow equalizing system is as follows: Assuming that the airplane is in flight and that the tanks 5 and 6 are half empty such that the fuel levels at 13 and 14, respectively, indicate that the remaining capacities in each tank are the same and have the same weight. It is, accordingly, desirable that as the airplane continues in its flight, one tank is not emptied at a faster rate than the other such that the loads from the tanks remain balanced about the C. of G. In these midpositions of the floats 15 and 16 the resistances in the potentiometers 17 and 18 will be approximately half cut in as indicated in the wiring diagram in Fig. 2, and the switching relays 27 and 28, being deenergized, will be set such that the pumps 7 and 8 will be running at their low speeds. In this balanced condition of the tanks, and the similarly balanced condition of the bridge circuit, there will be insufficient flow of current in either direction through the coil of the micro-positioner relay 26 to cause the relay to be tripped into either of its contacting positions. This micro-positioner or polarized relay is preferably provided with a fixed resistance or resistor, and a pair of capacitors or condensers to eliminate contact chatter of the relay, and to accomplish arc suppression.

Let us now assume that the fuel from the forward tank 5 is consumed at a substantially higher rate than that from the aft tank 6, and the float 15 drops such that proportionately more resistance is cut in in the potentiometer 17 than that in the potentiometer 18. This will result in a greater flow of current through that side of the bridge circuit passing through the potentiometer 18 and around through the coil of the polarized relay 26 such that the energization of this coil causes the contact to be closed on the side of the switching relay 28, which is energized to close the high side of the winding of the motor 8, such that this motor drives its booster pump at the higher speed causing the fuel in the tank 6 to be consumed at a greater rate than that from the tank 5. As this occurs, the float 16 begins to fall at a faster rate than the corresponding float 15 and after it has overtaken the float 15, and in doing so has cut in sufficient resistance in its potentiometer 18 to balance that which has been cut into the potentiometer 17, the bridge circuit will again be restored to its balanced condition, the coil of the polarized relay de-energized, the relay opened, and the switching relay 28 again opens such that the pump 8 is again run at its normal low speed. In other words, upon regaining the desired balance the gauges or fuel level sensing means will again tend to effect the return of the pump to the normal speed, and alternatively an unbalanced condition in the opposite direction would result in the balance bridge circuit affecting the proper relay to speed up the other pump delivery until a balanced condition is again obtained. It will accordingly be noted that the presently disclosed system automatically proportions the fuel flow from each of the two tanks in such manner that the balance of the airplane will not appreciably be affected. It will accomplish this such that when the fuel level in one of the two tanks or cells differs from that of the other by a predetermined quantity for which the system may be designed, the transfer pump in the lagging fuel tank will be switched to high speed through its corresponding control relay to correct or reduce the difference.

It will be understood that the airplane within which the forward and aft tanks are installed may have a number of additional tanks both within the wings and in the fuselage. The present invention is applicable to those tanks which are disposed farthest from the center of gravity of the airplane and they may be either the front and rear fuselage tanks as in the present instance, or they may be the outer wing tanks. For example, a particular installation to which the present arrangement has been applied, comprises a fuel system in which a total of seven self-sealing fuel tanks are installed in the airplane; four in the fuselage including a forward tank, center tank, a main tank and an aft tank; and three in the wings, a center wing tank and two outer wing tanks. Normally, in such an installation all of the fuel may flow into the main tank and is then pumped through a main tank manifold to the engine supply line. Because of the large spread of fuel in the airplane, fuel flow from the forward tank and the aft tank is necessarily automatically proportioned to maintain a correct airplane C. of G. position. The fuel flows under pump pressure from the forward and aft tanks, as well as certain of the other fuselage tanks, but may flow by gravity from the outer wing tank or other fuselage tanks which may be disposed at a higher elevation than the main tank containing the manifold to the engine supply line. In such an installation, however, in the event the transfer pump for the aft tank should fail, threatening a dangerous aft C. of G. condition, some means should be provided to warn the pilot such as the lighting of a warning light or similar device. Under such conditions flow from the forward tank may be shut off temporarily by means of a solenoid valve remotely actuated from the cockpit until the aft tank fuel is transferred to the main tank by gravity flow and all other fuel is used. In such an installation in the event the main fuel tank is damaged by battle action in flight, fuel may be fed directly to the manifold from the remaining tanks by operation of remote controlled valves to by-pass the damaged main tank.

It should also be noted that in addition to providing a satisfactory means of equalizing the flow of liquid from opposing tanks, the improved device can also be so arranged, by appropriate level sensing means, to provide a desired proportionate flow from opposing tanks. For example in some applications, it may be desirable, for certain loading conditions, to consume twice as much fuel from one tank as from its opposing tank. It will be understood that the improved control can be readily arranged to accomplish this result. Further, the ratio at which fuel is consumed from two opposing tanks may be varied as desired, for certain loading conditions, during the time the tanks are being emptied, when the fuel level sensing units are suitably designed.

Other forms and modifications of the present invention which may occur to those skilled in the art after reading the present description are intended to come within the scope and spirit of the present invention as more particularly set forth in the appended claims.

We claim:

1. In an aircraft including a pair of fluid tanks spaced on opposite sides of the center of gravity of the aircraft, and means for proportioning the discharge flow of fluid from each said tank comprising float means operatively associated with each said tank for sensing the capacity of said tank at any stage of the discharge of fluid therefrom, a balance bridge circuit including normally balanced resistances in the opposite legs of said circuit varied by movement of said float means, a polarized relay electrically associated with said balance circuit, a discharge pump associated with each said tank, a two-speed motor operatively associated with each said pump, a switching relay electrically associated with each said pump motor for the normal running of said pump at its low speed, said pump switching relays electrically associated with said polarized relay in such manner that lagging discharge flow from one of said tanks causes unbalance of said balance circuit, actuation of said polarized relay, closing of the corresponding switching relay and increase in motor speed of the pump for the tank which lags in its discharge.

2. In an aircraft, the combination of a pair of tanks mounted upon the aircraft, and means for maintaining the fluid levels in the tanks in predetermined relative proportion comprising fluid level sensing means associated with each said tank adapted to indicate the relative volume of fluid contained within the tank at any stage of the discharge of fluid therefrom, normally balanced reactances operatively associated with said sensing means, a balance bridge electrical circuit including said normally balanced reactances in opposite legs of said circuit adapted to be varied by changes of the respective fluid level sensing means, a primary relay electrically associated with said balance bridge adapted to respond to unbalance thereof, a discharge pump associated with each said tank, a variable speed motor operatively associated with at least one of said pumps, and secondary relay means responsive to operation of said primary relay connected to cause change of speed of said variable speed motor in such manner that an abnormal rate of flow from one of said tanks resulting in departure from the predetermined relative proportioning of the fluid levels with consequent unbalance of the balance bridge will effect a change of speed of the variable speed motor to correct disproportionate transfer of fluid from either of said tanks.

3. In a fluid supply system for aircraft, a pair of fluid storage tanks disposed on opposite sides of the center of gravity of the aircraft, a fluid transfer pump associated with each said tank for normally discharging fluid therefrom at a low pump speed, a motor operatively connected with each said fluid pump, speed varying means operatively associated with each pump and motor unit, sensing means including a transducer device actuated upon change of volume of fluid in each said tank, a polarized relay connected to selectively operate the speed varying means, and electrical means bridging said transducer device into a balance circuit for the actuation of the polarized relay for selectively increasing the speed of the motor of the pump which lags in its discharge as sensed by said fluid volume sensing means.

4. In a tank system for aircraft, a pair of tanks adapted to store liquid disposed in the aircraft, a transfer pump operatively associated with each said tank for normally discharging the contents thereof at a pre-set pump speed, a motor operatively connected to drive each said fuel pump, speed varying means operatively associated with each pump and motor unit, sensing means including a transducer actuated upon change of volume of liquid in each said tank, a polarized relay connected to selectively operate the speed varying means, and electrical means bridging said transducers into a balance circuit for the actuation of the polarized relay for selectively increasing the speed of the motor of either pump if it lags behind the other in its rate of discharge as detected by said change of volume sensing means.

5. In a liquid handling system for aircraft, the combination of a plurality of tanks disposed in the aircraft a pump associated with each tank adapted to pump the liquid contents therefrom, power means including switching relays connected to drive the pumps at controlled variable pumping rates, detector means adapted to respond at any variation of the relative quantities of liquid in the tanks at any stage of the liquid level therein and including transducer means forming normally balanced components of a balance bridge circuit and a primary relay adapted to compare signals received therefrom and issue a resultant speed control signal, connections from said switching relays to said primary relay adapted to vary the speed of operation of the said power means in accordance with the resultant speed control signal, whereby the said system is adapted to translate any difference of relative quantities of liquid in the tanks, into an adjustment of the pumping rates of the pumps to restore the ratio of relative quantities of liquid in the tanks.

References Cited in the file of this patent

UNITED STATES PATENTS

| | | |
|---|---|---|
| 2,260,312 | Gruman | Oct. 28, 1941 |
| 2,394,431 | Curtis et al. | Feb. 5, 1946 |
| 2,478,671 | Smith | Aug. 9, 1949 |
| 2,509,629 | De Giers et al. | May 30, 1950 |
| 2,509,978 | Ksieski | May 30, 1950 |